United States Patent
Park

(10) Patent No.: US 7,919,978 B2
(45) Date of Patent: *Apr. 5, 2011

(54) CONTROL CIRCUIT FOR CONTROLLING ON-DIE TERMINATION IMPEDANCE

(75) Inventor: Jung Hoon Park, Seoul (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/605,476

(22) Filed: Oct. 26, 2009

(65) Prior Publication Data

US 2010/0045340 A1  Feb. 25, 2010

Related U.S. Application Data

(63) Continuation of application No. 11/965,998, filed on Dec. 28, 2007, now Pat. No. 7,629,811.

(30) Foreign Application Priority Data

Oct. 23, 2007  (KR) .................. 10-2007-0106476

(51) Int. Cl.
   *H03K 17/16*    (2006.01)
   *H03K 19/003*   (2006.01)
   *G11C 7/00*     (2006.01)

(52) U.S. Cl. ................ 326/30; 365/222; 365/189.07; 327/109

(58) Field of Classification Search ............. 326/30; 365/233

See application file for complete search history.

(56) References Cited

U.S. PATENT DOCUMENTS

| 7,629,811 | B2 * | 12/2009 | Park ................. 326/30 |
| 7,663,946 | B2 * | 2/2010 | Kim ................. 365/194 |
| 2005/0134304 | A1 * | 6/2005 | Lee ................. 326/30 |
| 2005/0180229 | A1 * | 8/2005 | Jin ................. 365/194 |
| 2007/0126470 | A1 * | 6/2007 | Kim ................. 326/30 |
| 2008/0304334 | A1 * | 12/2008 | Lee et al. ......... 365/189.05 |

* cited by examiner

*Primary Examiner* — Vibol Tan
*Assistant Examiner* — Dylan White
(74) *Attorney, Agent, or Firm* — Ladas & Parry LLP

(57) ABSTRACT

The present invention relates to an ODT control circuit which is controlled in synchronization with an external clock during power-down mode. An ODT control circuit according to the present invention includes a clock control circuit which receives a synchronized internal clock signal and a DLL clock signal, and selects either one of the internal clock signal or the DLL clock signal according to the power mode to output a plurality of delayed clock signals; and an ODT control signal generation circuit which receives an ODT command, and controls the ODT command with the internal clock signal and a plurality of the delayed clock signals to generate and output an ODT control signal. According to the present invention, an ODT control signal for controlling an on-die termination resistor is synchronized with an external clock even during power-down mode, thereby more effectively controlling the ODT control signal.

18 Claims, 13 Drawing Sheets

CONTROL CIRCUIT FOR CONTROLLING ON-DIE TERMINATION IMPEDANCE

BACKGROUND OF THE INVENTION

The present invention relates to an on-die termination (ODT) control circuit which controls an on-die termination used in a semiconductor memory, and more specifically, to an ODT control circuit which is synchronization with an external clock during power-down mode.

In recent years, as the operating speed of semiconductor memory devices has become faster, a swing width of signals interfaced between the semiconductor memory devices gradually decreases. The reason is to minimize the delay time required for signal transmission. However, as the swing width of signals decreases, external noise interference increases, and signal reflection due to impedance mismatching at an interface terminal becomes critical.

Such impedance mismatching may be caused by external noise, variation of power supply voltage, changes in operating temperature, and variations during manufacturing processes, and the like. Impedence mismatching negatively impacts high-speed data transmission and may distort output data.

Transmission of a distorted output signal frequently causes problems at the receiving side, such as setup/hold fail, erroneous input level determination, and the like.

In particular, in electronic products employing a dynamic random access memory (DRAM), high speed operation has led to a dramatic increase in the frequency of a signal bus. Accordingly, various bus termination techniques are being studied for minimizing the distortion of signal integrity by eliminating impedance mismatching. One study revealed that a method using on-die termination (ODT) rather than mother board termination (MBT) is more advantageous for signal integrity, particularly in an electronic system with a stub bas structure.

On-die termination means a termination structure in which bus termination is attained at an input/output (I/O) port of a memory device mounted on a memory module. As a result, such on-die termination is an impedance matching circuit, which is also referred to as on-chip termination, and is employed in the vicinity of pads in an integrated circuit chip.

FIG. 1 is a block diagram illustrating a configuration of an ODT control signal generation circuit according to the prior art.

Referring to FIG. 1, an ODT control circuit according to the prior art is configured by including a clock buffer unit 10 which receives an external clock signal CLK and buffers it to output an internal clock signal iCLK, a mode identification signal generation unit 20 which receives an ODT enabling signal ODTEN and a clock enabling signal CKE to output a mode identification signal CKEODT, an ODT buffer unit 30 which receives an ODT command signal and buffers it to output an internal ODT command signal iODT, a DLL control unit 40 which receives DLL clocks (RCKDLL, FCKDLL), the mode identification signal CKEODT and the ODT enable signal ODTEN, and delays and outputs the DLL clocks for a predetermined period of time, and an ODT control signal generation unit 50 which combines the internal clock iCLK, the internal ODT signal, the DLL signals outputted from the DLL control unit, and the ODT enable signal ODTEN to output an ODT control signal ODTLAT.

The DLL clock signals (RCKDLL, FCKDLL) are generated by a delay-locked loop (DLL) circuit and then inputted. The DLL circuit enables the synchronization of a clock signal used for the final input/output of data to be synchronized with an external clock signal by compensating for a clock delay component which occurs during a process in which a clock signal being outputted is transmitted to a data output terminal inside the semiconductor memory device to generate an internal clock, the detailed explanation of which will be omitted because any person skilled in the art can easily achieve the design and also it is not directly related to this invention. Furthermore, in this invention, the DLL clock includes a rising DLL clock (RCKDLL) and a falling DLL clock (FCKDLL). The rising DLL clock RCKDLL is a clock synchronized with the rising edge of the clock signal, and the falling DLL clock FCKDLL is a clock synchronized with the falling edge of the clock signal.

The mode identification signal generation unit 20 outputs a high or low level signal whether the semiconductor device is in power-down mode or not.

FIG. 2 is a circuit illustrating an internal configuration of the DLL control unit 40.

Referring to FIG. 2, the DLL control unit 40 includes a NAND gate 41 which receives the ODT enable signal ODTEN and the mode identification signal CKEODT to generate an ODT enable bar signal ODTENB, a NOR gate 42 which receives the ODT enabling bar signal ODTENB and the rising DLL clock signal RCKDLL, a NOR gate 43 which receives the ODT enable bar signal ODTENB and the falling DLL clock signal FCKDLL, a rising DLL clock output unit 44 which delays the output of the NOR gate 42 for a predetermined period of time to output a rising DLL clock, and a falling DLL clock output unit 45 which delays an output of the NOR gate 43 for a predetermined period of time to output a falling DLL clock.

The rising DLL clock output unit 44 outputs clock signals (RCKDLL10, RCKDLL20) having a different delay amount, and the falling DLL clock output unit 45 outputs clock signals (FCKDLL15, FCKDLL25) having a different delay amount.

The rising DLL clock output unit 44 includes an inverter IV1 which inverts an output signal of the NOR gate 42, and delay units D1 and D2 which both delay a signal of the inverter IV1 for a predetermined period of time but which output the signal of the inverter Iv1 with a different delay amount.

The falling DLL clock output unit 45 includes an inverter IV2 which inverts and outputs an output signal of the NOR gate 43, and delay units D3 and D4 which both delay a signal of the inverter IV2 for a predetermined period of time but which output the signal of the inverter IV2 with a different delay amount.

The ODT control signal generation unit 50 receives an ODT signal ODT for controlling the ON or OFF status of an ODT resistor and generates and outputs an ODT control signal ODTLAT in synchronization with the internal clock signal iCLK and DLL clocks (RCKDLL10, RCKDLL20, FCKDLL15, FCKDLL25). The final outputted ODT control signal ODTLAT controls the ON or OFF status of an ODT resistor.

The ODT control signal generation unit 50 includes a plurality of latch circuits having an internal ODT signal iODT as an input, and a plurality of transmission gates being controlled by DLL clock signals (RCKDLL10, RCKDLL20, FCKDLL15, FCKDLL25). Any person skilled in the art can create the ODT control signal generation unit 50 in a variety of ways, and therefore a detailed explanation of the ODT control signal generation unit 50 is omitted.

According to such a prior art, during a power-down mode, it cannot output a normal clock since an ODT enable signal ODTEN is disabled and an inverted ODT enable signal ODTENB being inputted to NOR gates 42 and 43 of the DLL control unit 40 is fixed to a high level.

Accordingly, during a power-down mode, accurate control cannot be acheived as is possible in a normal mode, and the time for activating the ODT control signal ODTLAT cannot be controlled at the desired point of time.

SUMMARY OF THE INVENTION

The present invention provides, inter alia, an ODT control signal in synchronization with an external clock during power-down mode.

Further, the present invention is directed to more correctly providing a time for generating an ODT control signal.

An ODT control circuit according to an embodiment of the present invention includes a clock control circuit which receives an internal clock signal in synchronization with an external clock and a DLL clock signal, and which selects either the internal clock signal or the DLL clock signal to output a plurality of delayed clock signals according to a power mode, and an ODT control signal generation circuit which receives an ODT command, and which controls the ODT command with the internal clock signal and a plurality of the delayed clock signals to generate and output an ODT control signal.

The clock control circuit includes a mode identification signal generation unit which logically combines an ODT enable signal and a clock enable signal to output a mode identification signal for identifying the mode of the semiconductor device, and a clock control unit which selects either one of the internal clock signal or the DLL clock signal according to the mode identification signal to output a plurality of delayed clock signals.

The ODT control signal generation circuit includes an ODT buffer unit which receives an ODT command and buffers it to output an internal ODT command, and an ODT control signal generation unit which controls the internal ODT command to generate an ODT control signal.

The mode identification signal generation unit outputs a normal mode signal when a clock enable signal is activated, and outputs a power-down mode signal when the clock enable signal is deactivated.

The clock control unit includes a clock enable signal generation unit which logically combines the ODT enable signal and the mode identification signal to generate a clock enable signal for activating the DLL clock signal and the internal clock signal, a clock selection unit which selects either one of a DLL clock signal or an internal clock signal according to the clock enable signal, and a clock output unit which delays and outputs an output signal of the clock selection unit for a predetermined period of time.

The clock enable signal generation unit includes a DLL clock enable signal generation unit which combines the ODT enable signal and the mode identification signal to output a DLL clock enable signal, and an internal clock enable signal generation unit which combines the ODT enable signal and an inverted mode identification signal to generate an internal clock enable signal.

The DLL clock enable signal generation unit outputs a high level of the DLL clock enable signal during normal mode, and outputs a low level of the DLL clock enable signal during power-down mode.

The DLL clock enable signal generation unit includes a NAND gate which combines the ODT enable signal and the mode identification signal to output a DLL clock enable bar signal, and an inverter which inverts an output of the NAND operation unit to output a DLL clock enable signal.

The internal clock enable signal generation unit disables an internal clock enable signal during normal mode, and enables an internal clock enable signal during power-down mode.

The clock selection unit includes a rising clock selection unit which selects and activates either one of a rising DLL clock signal among the DLL clocks or an internal clock signal, and a falling clock selection unit which selects and activates either one of a falling DLL clock signal among the DLL clocks or an internal clock bar signal.

The rising clock selection unit includes a normal rising clock selection unit which activates a path of the rising DLL clock signal to output a rising DLL clock signal during normal mode, and a power-down rising clock selection unit which activates a path of the internal clock signal to output an internal clock signal during power-down mode.

The falling clock selection unit includes a normal failing clock selection unit which activates a path of the falling DLL clock signal to output a falling DLL clock signal during normal mode, and a power-down falling clock selection unit which activates a path of the internal clock bar signal to output an internal clock bar signal during power-down mode.

The clock output unit includes a rising clock output unit which outputs a rising clock signal among the output signals of the clock selection unit, and a falling clock output unit which outputs a falling clock signal among the output signals of the clock selection unit.

The rising clock output unit includes a delay unit which delays and outputs the rising clock signal for a predetermined period of time.

The falling clock output unit includes a delay unit which delays and outputs the falling clock signal for a predetermined period of time.

The delay unit includes a plurality of delay circuits having a different delay amount.

The ODT control signal generation unit includes a first inverter which inverts and outputs the internal ODT signal, a latch unit which latches an output signal of the first inverter, and has a transmission gate controlled by an internal clock signal and an output signal of the clock control unit, a reset unit which initializes the latch unit when an ODT enable signal is at a low level, and an ODT control signal output unit which combines an output signal of the latch unit to generate an ODT control signal.

The latch unit includes a first latch unit having a first transmission gate which latches an output signal of the first inverter, and transmits a latch signal by a control of the internal clock signal, a second latch unit having a second transmission gate which latches a signal transmitted by the first transmission gate, and transmits a latch signal by a control of a first output signal of the clock control unit, a third latch unit having a third transmission gate which latches a signal transmitted by the second transmission gate, and transmits a latch signal by a control of a second output signal of the clock control unit, a fourth latch unit having a fourth transmission gate which latches a signal transmitted by the third transmission gate, and transmits a latch signal by a control of a third output signal of the clock control unit, a fifth latch unit having a fifth transmission gate which latches a signal transmitted by the fourth transmission gate, and transmits a latch signal by a control of a fourth output signal of the clock control unit, and a sixth latch unit which latches a signal transmitted to the fifth transmission gate.

The ODT control signal output unit includes a NAND operation unit which inverts an output signal of the fifth latch unit to combine an output signal of the sixth latch unit.

The ODT control circuit further includes a delay unit which delays an output signal of the NAND operation unit for a predetermined period of time.

According to the present invention, an ODT control signal for controlling an on-die termination resistor is synchronized with an external clock even during power-down mode, thereby more effectively controlling the ODT control signal.

Moreover, an ODT control can be effectively performed as describe above to cope with a wide range of applications.

DESCRIPTION OF SPECIFIC EMBODIMENTS

The present invention relates to an ODT control device which generates a rising clock and a falling clock using an external clock signal during power-down mode, and generates an ODT control signal in synchronization with the signal.

Hereinafter, a preferred embodiment of the present invention will be described in detail with reference to the accompanying drawings.

Figure 1:
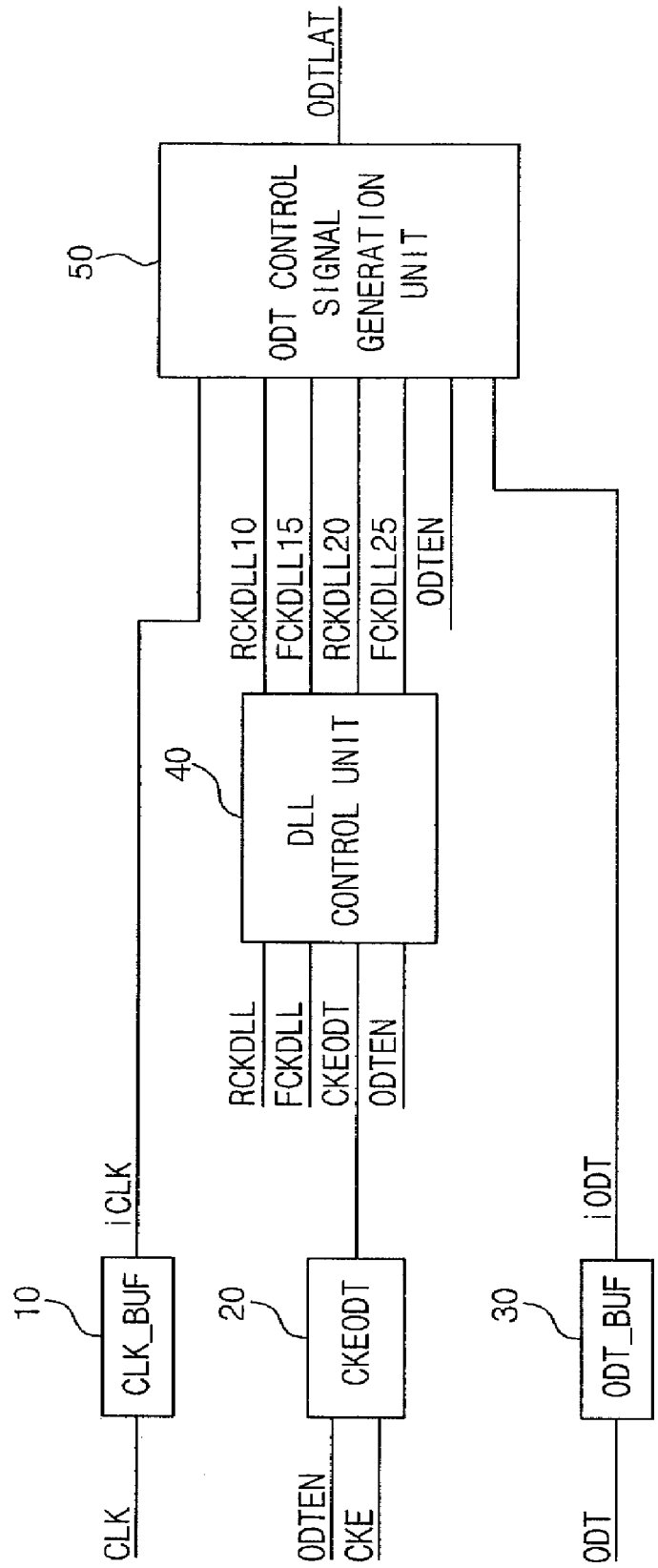
FIG. 1 is a block diagram illustrating an ODT control signal generation circuit according to the prior art.
Figure 2:
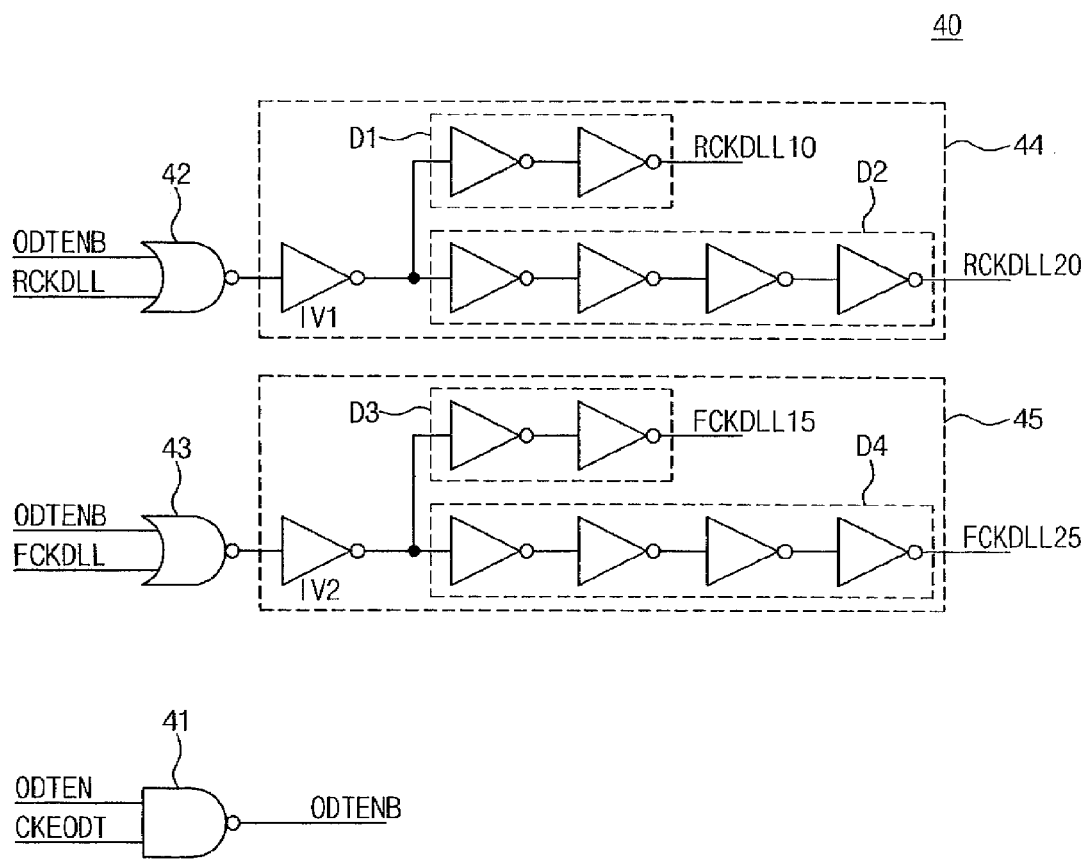
FIG. 2 is a detailed circuit diagram illustrating a DLL control unit 40 of FIG. 1.
Figure 3:
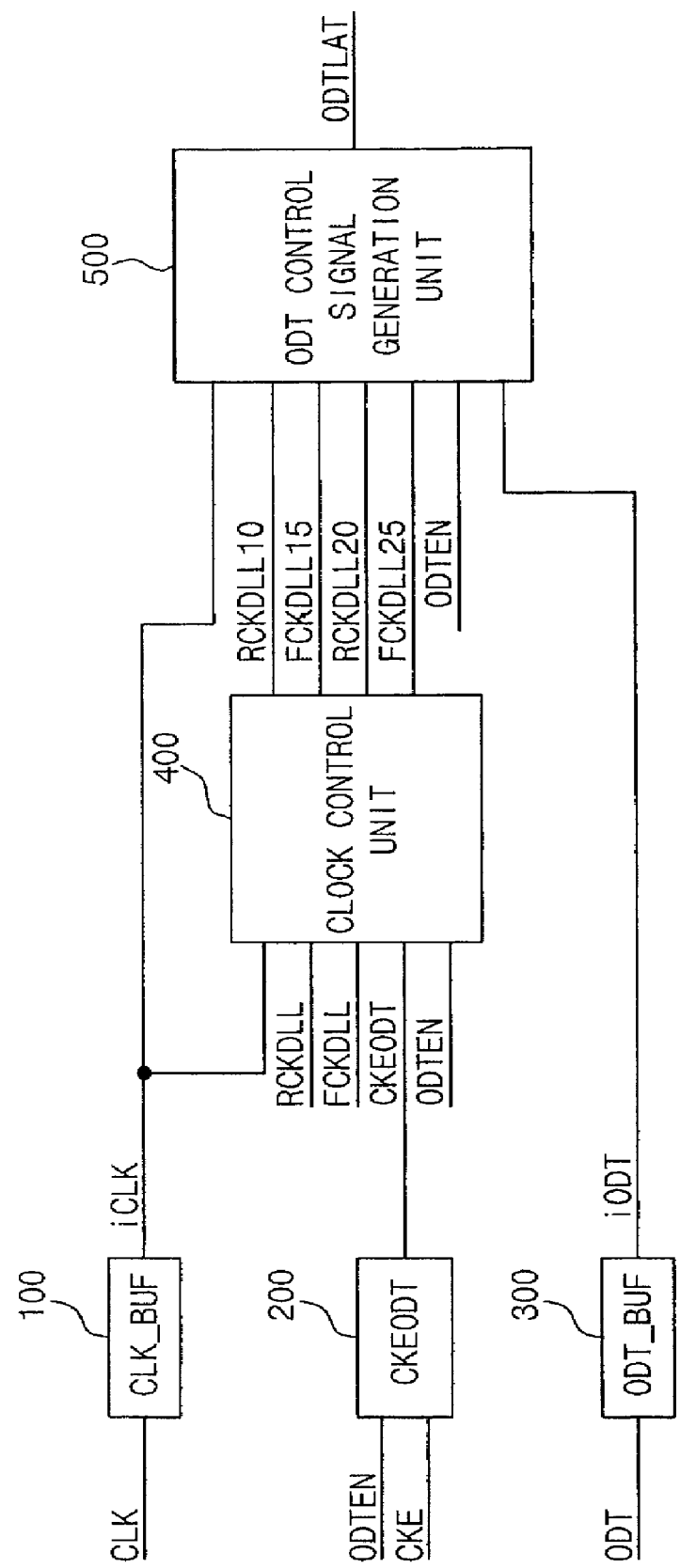
FIG. 3 is a block diagram illustrating an ODT control signal generation circuit according to the present invention.

FIG. 3 is a block diagram illustrating an ODT control circuit according to the present invention.

Referring to FIG. 3, the ODT control circuit is configured to have a clock buffer unit 100 which receives and buffers an external clock signal CLK to output an internal clock signal iCLK, a mode identification signal generation unit 200 which receives an ODT enable signal ODTEN and a clock enable signal CKE to generate a mode identification signal CKEODT, an ODT buffer unit 300 which receives and buffers an ODT command signal to output an internal ODT command signal iODT, a clock control unit 400 which receives the internal clock signal iCLK, DLL clocks (RCKDLL, FCKDLL), the mode identification signal CKEODT and the ODT enable signal ODTEN, and delays and outputs the DLL clock or the internal clock iCLK for a predetermined period of time, and an ODT control signal generation unit 500 which combines the internal clock iCLK, an internal ODT signal, signals (RCKDLL10, RCKDLL15, FCKDLL20, FCKDLL25) outputted from the clock control unit, and the ODT enable signal ODTEN to output an ODT control signal ODTLAT.

The configurations of the clock buffer 100 and the ODT buffer 300 are widely-known in the relevant industry, and easily implemented by those skilled in the art, and therefore the detailed explanation is omitted.

The mode identification signal generation unit 200 outputs a high or low level signal according to a mode of the semiconductor device, i.e., according to normal or power-down mode.

Figure 4:
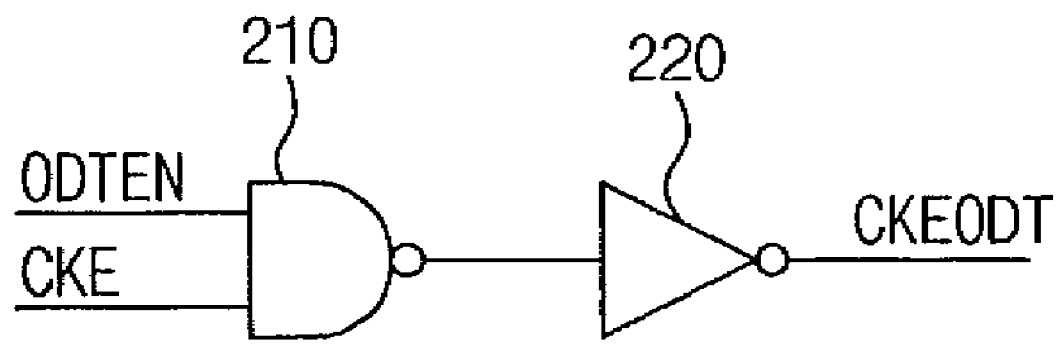
FIG. 4 is a detailed circuit diagram illustrating a mode identification signal generation unit 200 of FIG. 3.

Referring to FIG. 4, the mode identification signal generation unit 200 includes a NAND gate 210 which combines an ODT enable signal ODTEN and a clock enable signal to perform a NAND operation, and an inverter 220 which inverts an output of the NAND gate 210 to output a mode identification signal CKEODT. According to the above-mentioned configuration, during power-down mode, since the clock enable signal CKE has a low level, the mode identification signal CKEODT always maintains a low level. Accordingly, the mode of the device can be identified according to the level of the mode identification signal CKEODT.

Figure 5:
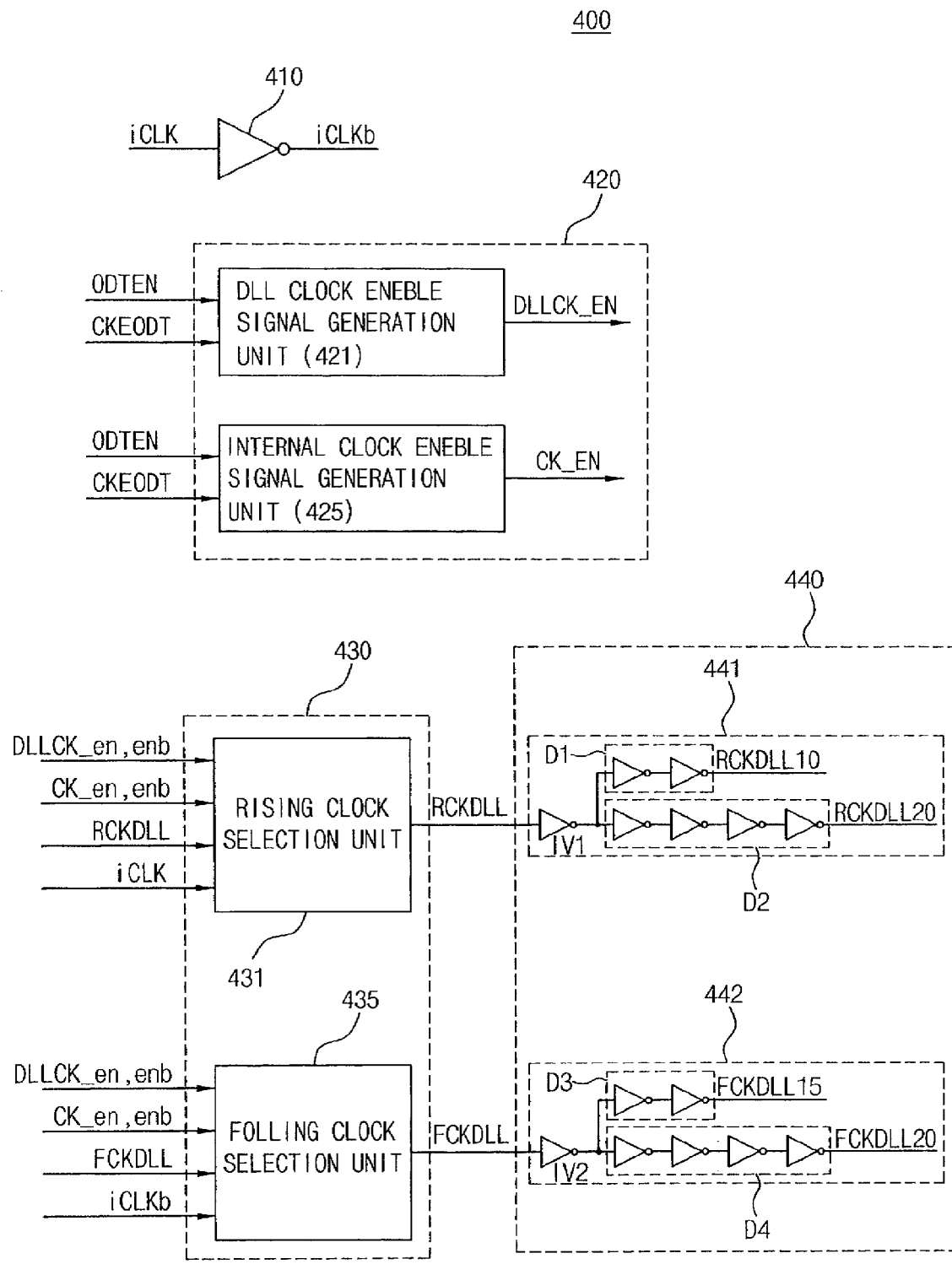
FIG. 5 is a detailed block diagram illustrating a clock control unit 400 of FIG. 3.

FIG. 5 is a block diagram of the clock control unit 400, and FIGS. 6 to 9 are detailed circuit diagrams of the block.

Referring to FIG. 5, the clock control unit 400 includes an inverter 410 which inverts an internal clock iCLK to output an internal clock bar signal iCLKb, a clock enable signal generation unit 420 which generates a signal for activating either one of a DLL clock or an internal clock signal, a clock selection unit 430 which selects and outputs either one of a DLL clock or an internal clock signal according to an output signal of the clock enable signal generation unit, and a clock output unit 440 which delays and outputs signals (RCKDLL, FCKDLL) outputted from the clock selection unit for a predetermined period of time.

An output signal iCLKb of the inverter 410 is received by the clock selection unit 430 to be used for outputting a falling clock FCKDLL.

The clock enable signal generation unit 420 includes a DLL clock enable signal generation unit 421 for activating a DLL clock, and an internal clock enable signal generation unit 425 for activating an internal clock.

Figure 6:
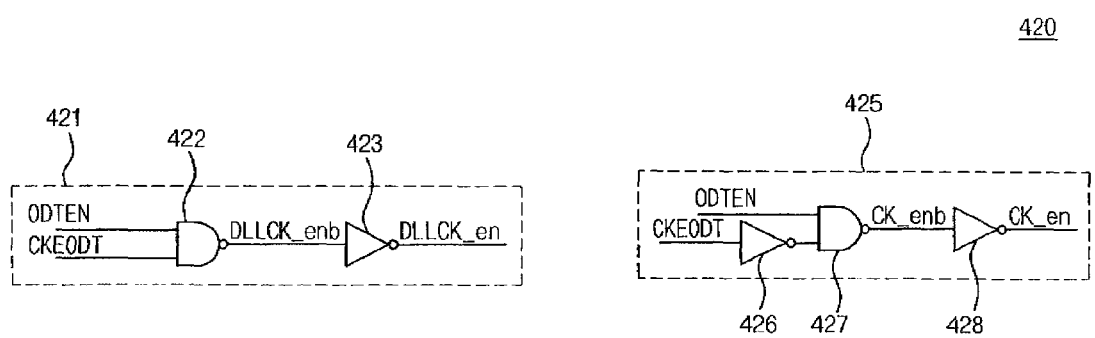
FIG. 6 is a detailed circuit diagram illustrating a clock enable signal generation unit 420 of FIG. 5.

Referring to FIG. 6, the DLL clock enable signal generation unit 421 includes a NAND gate 422 which combines an ODT enable signal ODTEN and a mode identification signal CKEODT to output a DLL clock enable bar signal DLLCK_enb, and an inverter 423 which inverts an output of the NAND gate 422 to output a DLL clock enable signal DLLCK_en, and the internal clock enable signal generation unit 425 includes a NAND gate 427 which combines an ODT enable signal ODTEN and an inverted mode identification signal CKEODT to output an internal clock enable bar signal CK_enb, and an inverter 428 which inverts an output of the NAND gate 427 to output an internal clock-enable signal CK_en. To generate a signal inputted to the NAND gate 427, it may additionally include an inverter 426 which inverts a mode identification signal CKEODT to output to the NAND gate.

Referring to FIG. 5 again, the clock selection unit 430 includes a rising clock selection unit 431 and a falling clock selection unit 435.

The rising clock selection unit 431 selects either one of a rising DLL clock RCKDLL or an internal clock signal ICLK to activate and output only one path, and blocks a signal path which has not been selected.

Figure 7:
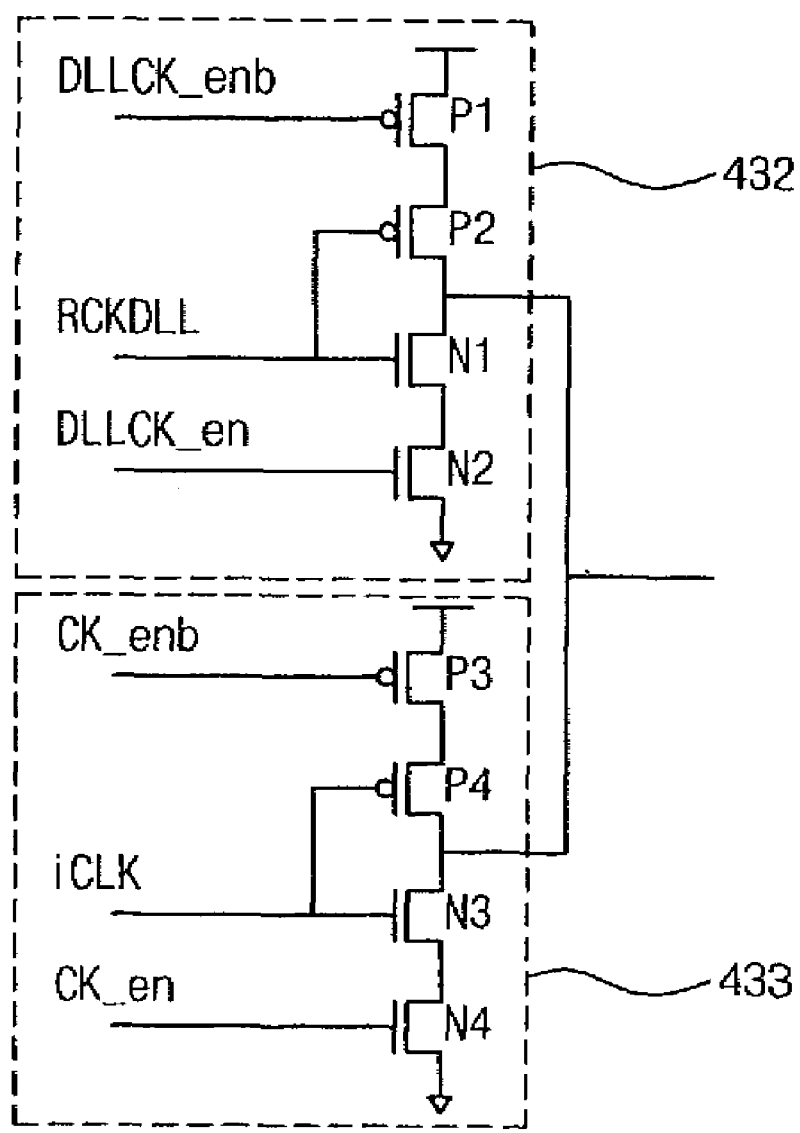
FIG. 7 is a detailed circuit diagram illustrating a rising clock selection unit 431 of FIG. 5.

Referring to FIG. 7, the rising clock selection unit 431 includes a normal rising clock selection unit 432 which activates a path of the rising DLL clock RCKDLL during a normal mode, and a power-down rising clock selection unit 433 which activates a path of the internal clock signal iCLK during a power-down mode. For the normal rising clock selection unit 432 and the power-down rising clock selection unit 433, two PMOS transistors and two NMOS transistors are serially connected to each other, respectively.

More specifically, the normal rising clock selection unit 432 includes a PMOS transistor P1 to the gate of which is inputted a DLL clock enable bar signal DLLCK_enb, a PMOS transistor P2 to the gate of which is inputted a rising DLL clock RCKDLL, an NMOS transistor N1 to the gate of which is inputted the rising DLL clock RCKDLL, and an NMOS transistor N2 to the gate of which is inputted the DLL clock enable signal DLLCK_en.

The power-down rising clock selection unit 433 includes a PMOS transistor P3 to the gate of which is inputted an internal clock enable bar signal CK_enb, a PMOS transistor P4 to the gate of which is inputted an internal clock iCLK, an NMOS transistor N3 to the gate of which is inputted the internal clock iCLK, and an NMOS transistor N4 to the gate of which is inputted an internal clock enable signal CK_en.

Figure 8:
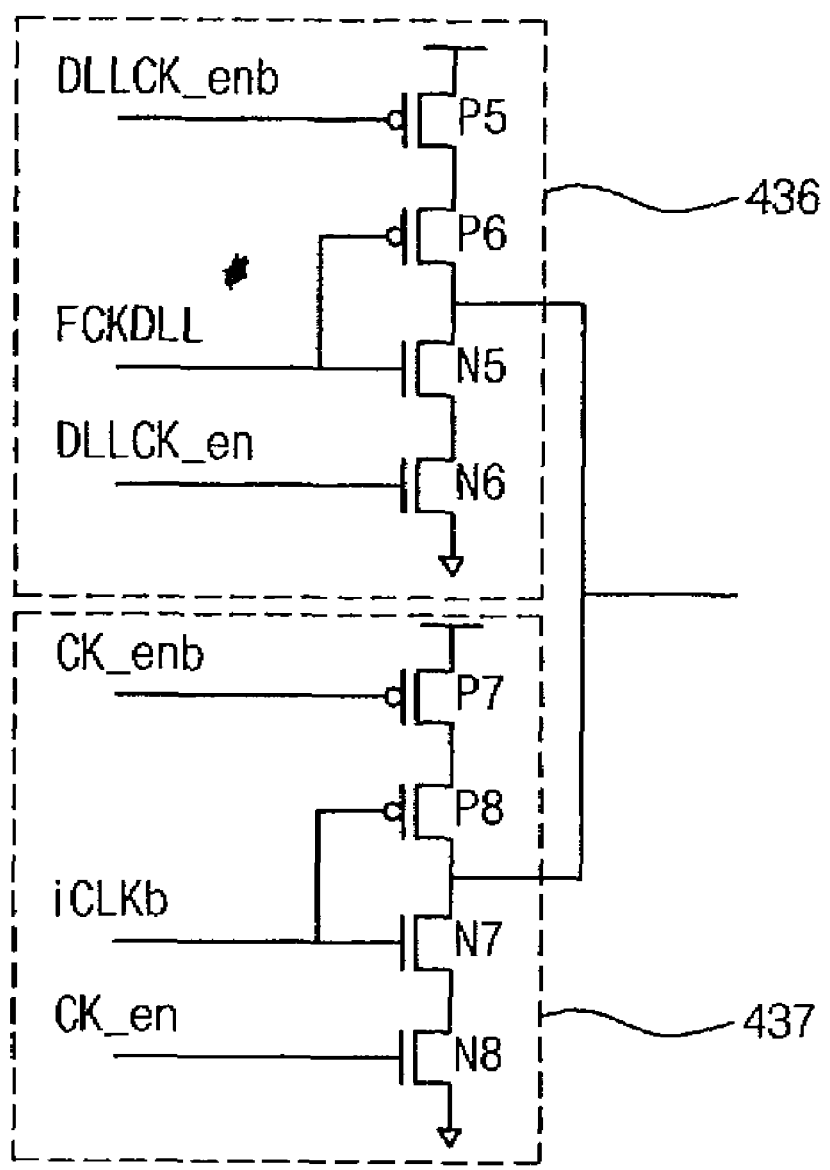
FIG. 8 is a detailed circuit diagram illustrating a falling clock selection unit 435 of FIG. 5.
Figure 12:
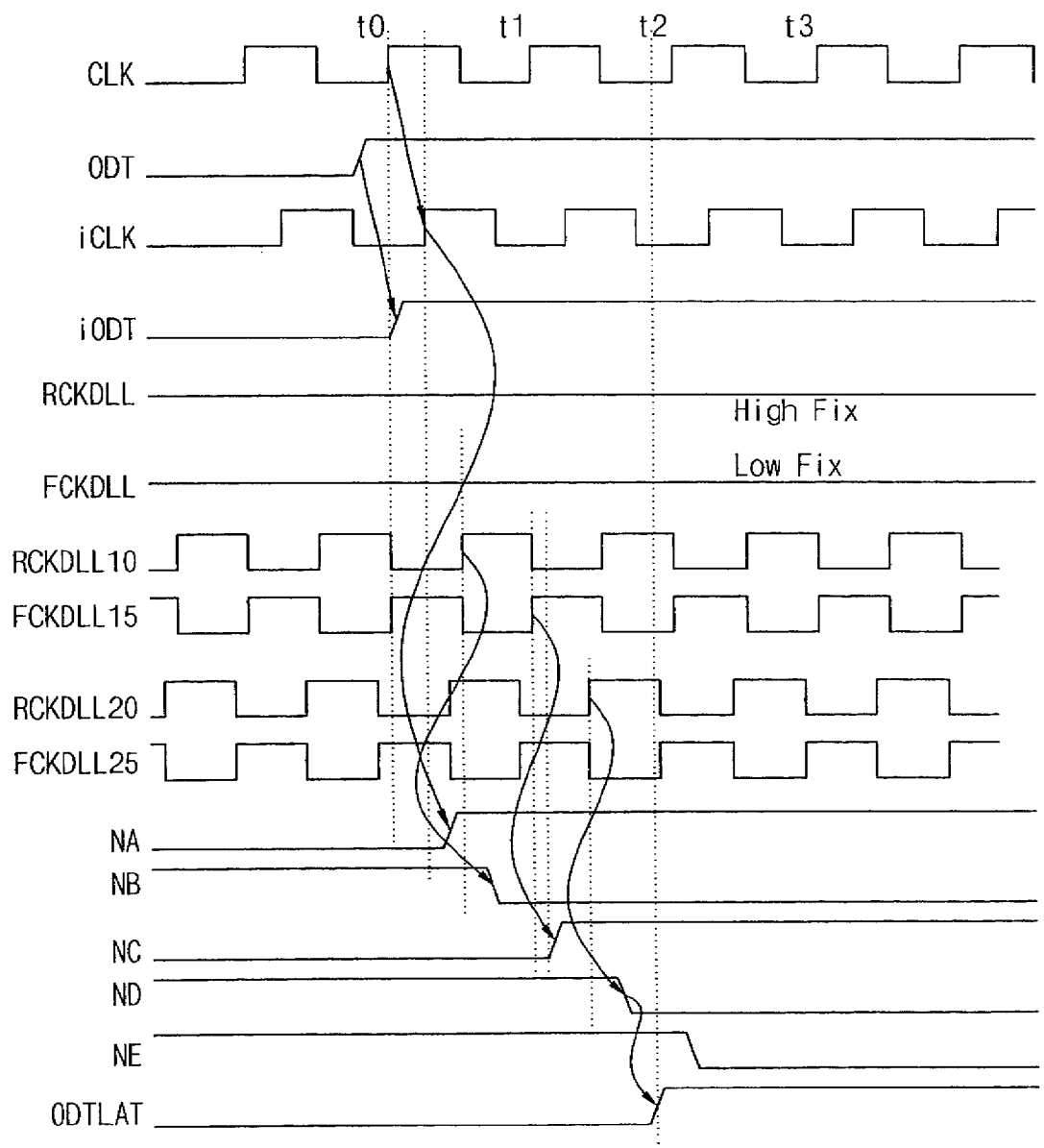
FIG. 12 is a timing diagram illustrating when an ODT command becomes ON during power-down mode according to the present invention.

Referring to FIG. 8, the falling clock selection unit 435 also includes a normal falling clock selection unit 436 and a power-down failing clock selection unit 437, and it is seen that two PMOS transistors and two NMOS transistors are serially connected to each other, respectively, in the clock selection units 436 and 437. It is different from the rising clock selection unit 431 as illustrated in FIG. 12 that a falling DLL clock FCKDLL is inputted to transistors P6 and N5, and an internal clock bar signal iCLKb is inputted to transistors P8 and N7 in order to output a falling clock.

Referring to FIG. 5 again, the clock output unit 440 includes a rising clock output unit 441 which outputs a rising clock outputted from the rising clock selection unit 431, and a falling clock output unit 442 which outputs a falling clock outputted from the falling clock selection unit.

The rising clock selection unit 441 includes an inverter IV1 which inverts the phase of the rising clock RCKDLL outputted from the rising clock selection unit, and delay units D1 and D2 which delay an output of the inverter IV1 for a predetermined period of time but which have a different delay amount. The delay amount of the delay units D1 and D2 can be changed in various ways according to a time for generating an ODT control signal ODTLAT.

The falling clock output unit 442 also includes an inverter IV2 which inverts a falling clock RCKDLL and delay units D3 and D4.

Furthermore, the ODT control signal generation unit 500 receives clock signals (RCKDLL10, RCKDLL20, FCKDLL15, FCKDLL25) outputted from the clock control unit 400 and an internal ODT signal (iODT signal) by a control of an internal control clock iCLK to finally output an ODT control signal ODTLAT. The ODT control signal ODTLAT controls an on-die termination resistor to be ON or OFF.

In case of the above-mentioned configuration, the operation of outputting a clock will be summarized as follows.

First, during a normal mode, if the ODT enable signal ODTEN is activated at a high level and the clock enable signal CKE becomes a high level, then the mode identification signal CKEODT maintains the high level. Therefore, the DLL clock enable signal DLLCK_en becomes a high level and the internal clock enable signal CK_en becomes a low level. Since a PMOS transistor P1 and an NMOS transistor N2 of the rising clock selection unit 431 are turned on by the clock enable signals, the rising DLL clock RCKDLL is outputted through a PMOS transistor P2 and an NMOS transistor N1. In other words, a path of the DLL clock is enabled. At this time, the internal clock enable signal CK_en is at a low level, and therefore a PMOS transistor P3 and an NMOS transistor N4 are turned off to disable a path of the internal clock. Accordingly, the rising DLL clock RCKDLL is finally outputted as rising clock signals (RCKDLL10, RCKDLL20) through the rising clock output unit 441.

Since the same signal is also inputted to the falling clock selection unit 435, a path of the internal clock bar signal iCLKb is disabled and a path of the falling DLL clock FCKDLL is enabled, and therefore the falling DLL clock FCKDLL is outputted as falling clocks (FCKDLL15, FCKDLL25) through the falling clock output unit 442.

Next, during a power-down mode, even if the ODT enable signal ODTEN is activated to a high level, the clock enable signal CKE becomes a low level, and therefore the mode identification signal CKEODT is changed to a low level. As a result, the DLL clock enable signal DLLCK_en becomes a low level, and the internal clock enable signal CK_en becomes a high level. Since a PMOS transistor P1 and an NMOS transistor N2 of the rising clock selection unit 431 are turned off by the clock enable signals, a path of the DLL clock is disabled. Furthermore, the internal clock enable signal CK_en is at a high level, and therefore a PMOS transistor P3 and an NMOS transistor N4 are turned on to enable a path of the internal clock. Accordingly, the internal clock signal iCLK is outputted through a PMOS transistor P4 and an NMOS transistor N3, and finally outputted as rising clock signals (RCKDLL10, RCKDLL20) through the rising clock output unit 441.

Since the same signal is also inputted to the falling clock selection unit 435, a path of the internal clock bar signal iCLKb is enabled and a path of the falling DLL clock FCKDLL is disabled, and therefore the internal clock bar signal is finally outputted as falling clocks (FCKDLL15, FCKDLL25).

Due to the above-mentioned operation, even during a power-down mode, it is possible to generate a rising clock and a falling clock by an internal clock signal iCLK, and control an ODT control signal ODTLAT by the rising and falling clocks.

Figure 9:
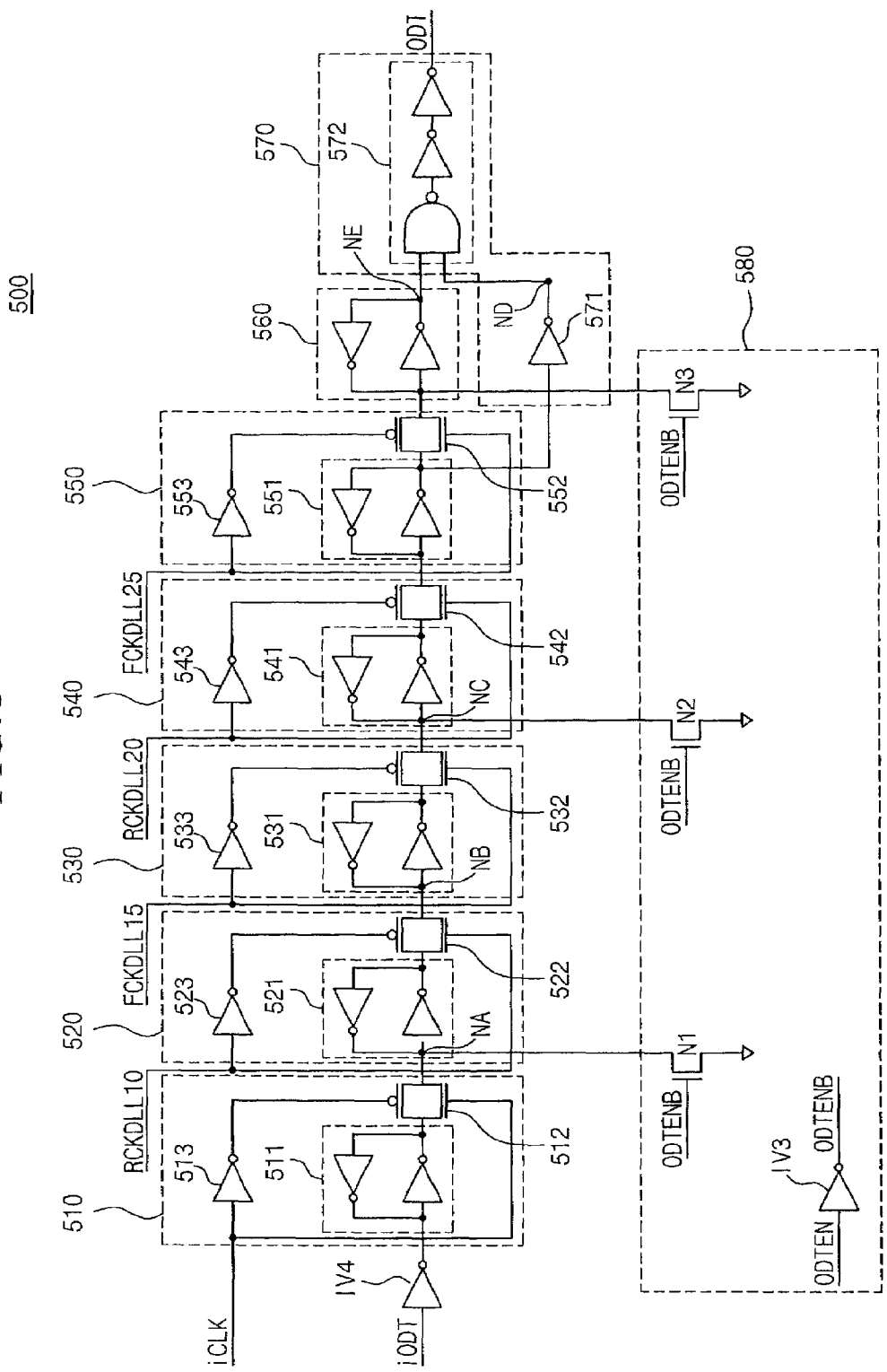
FIG. 9 is a detailed circuit diagram illustrating an ODT control signal generation unit 500 of FIG. 3.

FIG. 9 is a detailed circuit diagram illustrating a configuration of the ODT control signal generation unit 500.

The ODT control signal generation unit 500 includes an inverter IV3 which inverts and outputs an ODT enable signal ODTEN, an inverter IV4 which inverts a phase of an internal ODT signal iODT, a plurality of latch circuits 510, 520, 530, 540, 550 and 560 which receive an output signal of the inverter IV4 and transmit the internal ODT command signal iODT according to the internal clock signal iCLK and output signals (RCKDLL10, FCKDLL15, RCKDLL20, FCKDLL25) of the DLL control unit, an ODT control signal output unit 570 which combines output signals of the latch circuits to output an ODT control signal ODTLAT, and a reset unit 580 which resets the latch circuits.

The latch circuit 510 includes a latch unit 511, a transmission gate 512, and an inverter 513. According to the above-described configuration, the latch circuit 510 receives an inverted internal ODT signal from the inverter IV4 and inverts the phase by the latch unit 511 to transmit the internal ODT signal to the following latch circuit 520. At this time, the ON/OFF status of the transmission gate 512 is controlled by the internal clock iCLK. In other words, if the internal clock signal iCLK is high, then the transmission gate is ON, and if it is low, then the transmission gate is OFF. The remaining latch circuits 520, 530, 540, 550 and 560 have the same structure and only differ in control signals for controlling the transmission gates 522, 532, 542 and 552; therefore, the detailed explanation is omitted.

Furthermore, the ODT control signal output unit 570 includes an inverter 571 which inverts an output of the latch circuit 550, and a combination unit 572 which combines output signals of the inverter 571 and the latch circuit 560 to generate and output an ODT control signal. The combination unit 572 may include a NAND gate and a plurality of inverters.

In other words, the ODT control signal generation unit 500 receives an internal clock signal iCLK, an internal ODT signal iODT, an ODT enable signal ODTEN, and DLL clock signals (RCKDLL10, FCKDLL15, RCKDLL20, FCKDLL25) as input signals to generate and output an ODT control signal ODTLAT, and the ODT control signal ODTLAT controls the ON/OFF status of an ODT resistor.

The reset unit 580 includes an inverter IV3 which inverts an ODT enable signal, a first through a third MOS transistors N1, N2 and N3 to the gate of which is inputted an output signal ODTENB of the inverter. The MOS transistors N1, N2 and N3 are turned on when the output signal ODTENB is enabled to reset latch units 521, 541 and 560 to ground voltage level.

Figure 10:
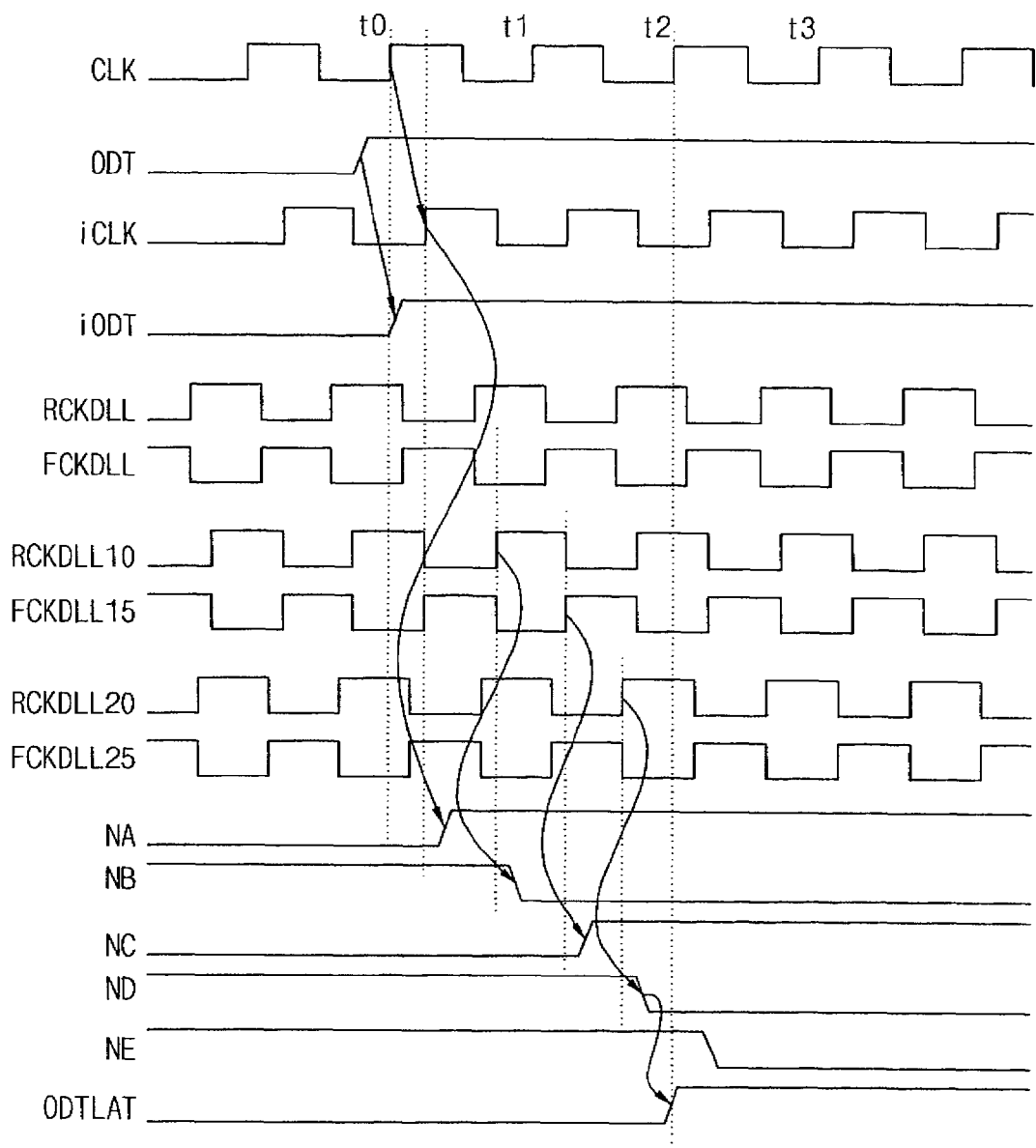
FIG. 10 is a timing diagram illustrating when an ODT command becomes ON during normal mode according to the present invention.
Figure 11:
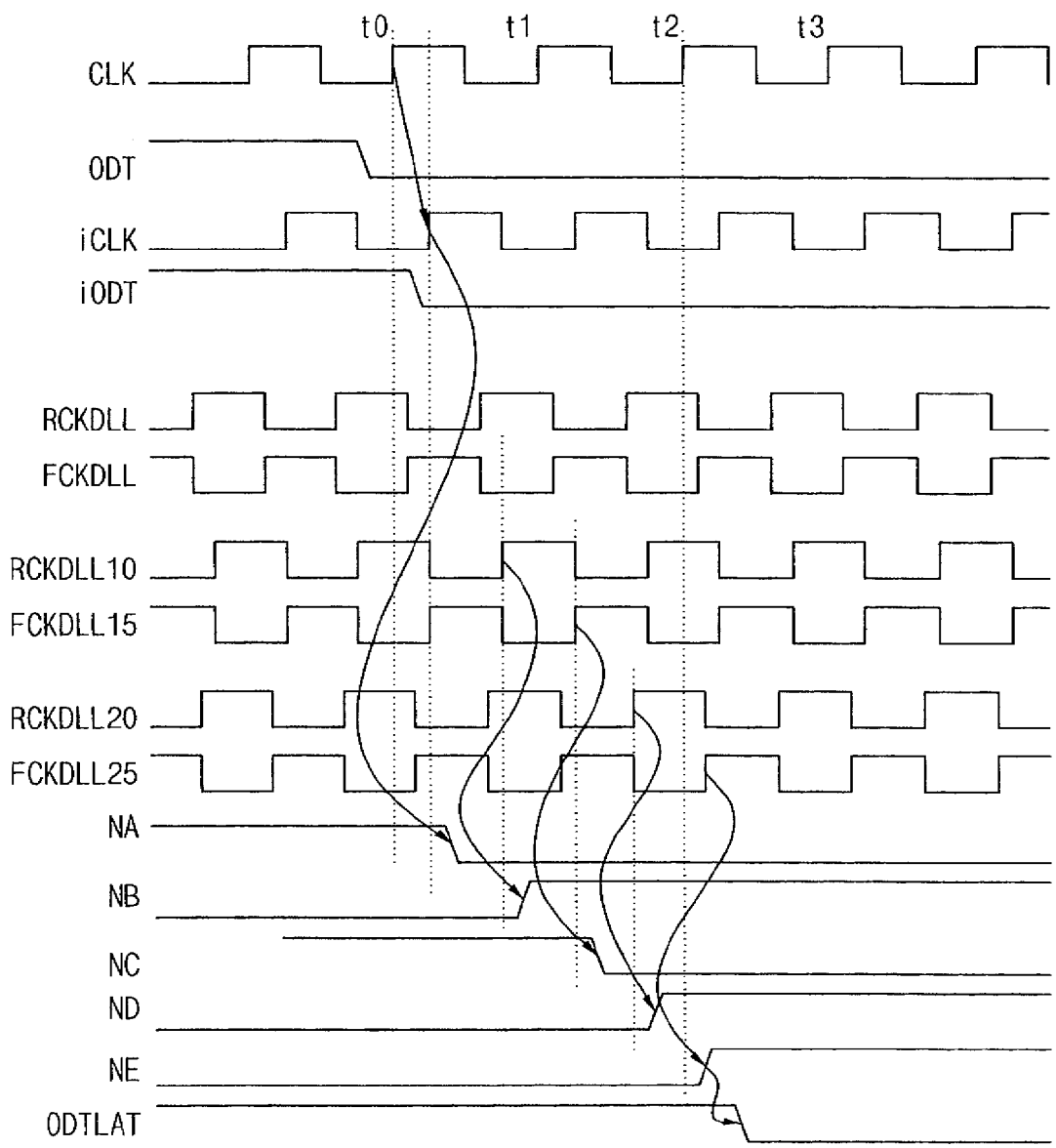
FIG. 11 is a timing diagram illustrating when an ODT command becomes OFF during normal mode according to the present invention.

FIGS. 10 and 11 are timing diagrams illustrating when an ODT signal is ON or OFF during normal mode according to the present invention.

If an ODT function is activated by a mode register (not shown), then an ODT enable signal ODTEN maintains a high level, and the mode identification signal generation unit 200 outputs a high level of the mode identification signal CKEODT during normal mode, and outputs a low level of the mode identification signal CKEODT during power-down mode.

As a result, during a normal mode, DLL clocks (RCKDLL10, RCKDLL20, FCKDLL15, FCKDLL25) are generated from the clock control unit 400 and inputted to an ODT control signal generation unit 500. At this time, an internal ODT signal iODT inputted to the ODT control signal generation unit 500 is latched and transmitted to the following latch unit by a control of the internal clock signal iCLK. Then, it is synchronized with a rising DLL clock RCKDLL20 to output an ODT control signal ODTLAT at a high level state and enables an ODT circuit (not shown).

If an ODT signal is inputted at a low level state (ODT off) from the outside, then it is synchronized with a failing DLL clock FCKDLL25 in the ODT control signal generation unit 500 to output a low level of the ODT control signal ODTLAT and disable an ODT circuit (not shown).

Figure 13:
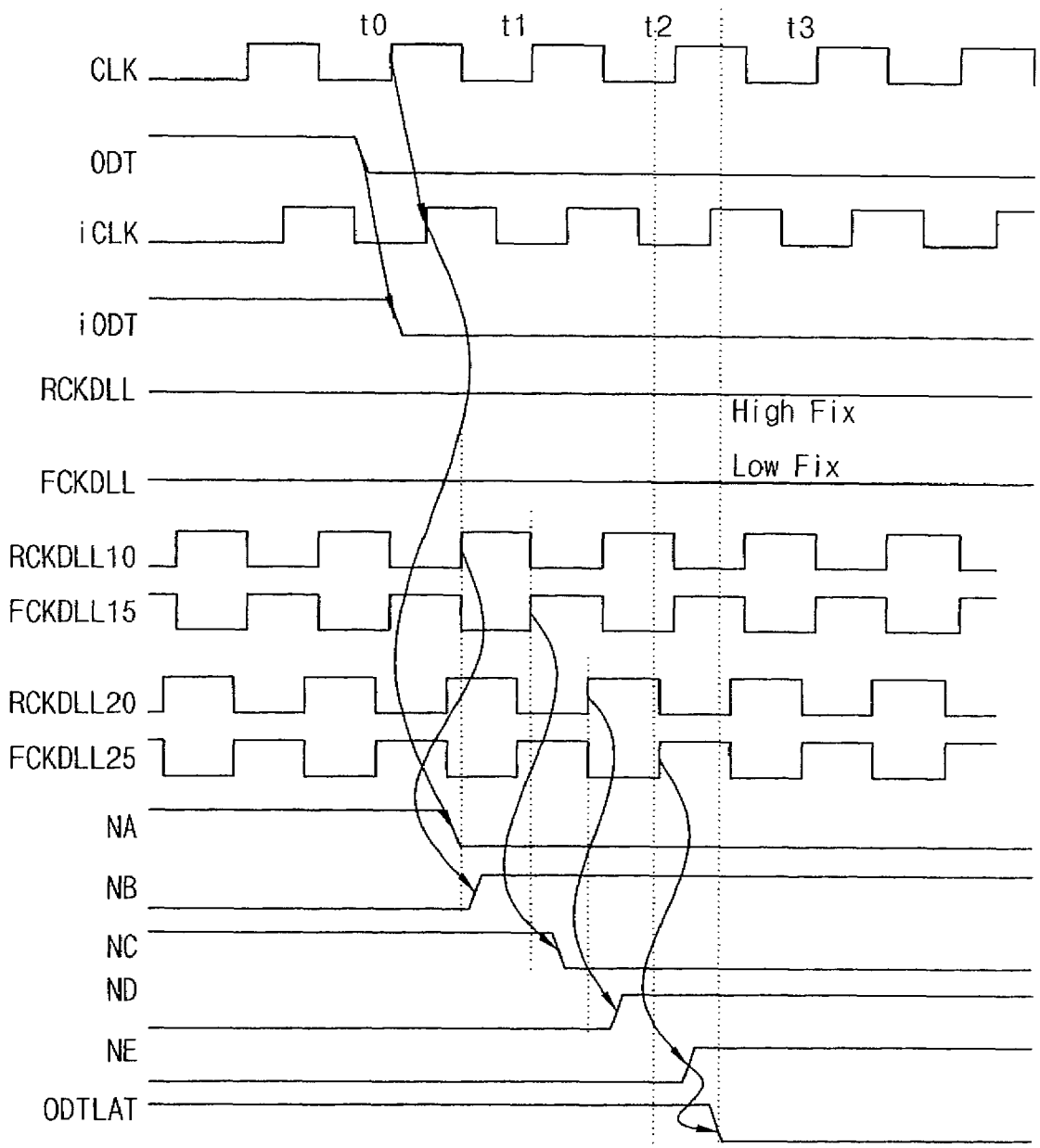
FIG. 13 is a timing diagram illustrating when an ODT command becomes OFF during power-down mode according to the present invention.

FIGS. 12 and 13 are timing diagrams illustrating when an ODT control signal is generated during power-down mode.

FIG. 12 is an ODT on timing diagram during power-down mode, and even if DLL clocks (RCKDLL, FCKDLL) applied from the outside are fixed to a high or low level, it is seen that signals (RCKDLL10, RCKDLL20, FCKDLL15, FCKDLL25) outputted from the clock control unit 400 are outputted in the same clock type as shown in normal mode. As a result, an internal ODT signal iODT inputted to the ODT control signal generation unit 500 forms the same waveform as shown in nodes NA, NB, NC, ND and NE through latch circuits, and finally an ODT control signal ODTLAT is outputted from the ODT control signal output unit. It is seen in FIG. 12 that the ODT control signal ODTLAT is synchronized with a rising clock RCKDLL20.

FIG. 13 is an ODT off timing diagram during power-down mode; when compared with FIG. 12, an ODT command signal iODT has an opposite phase, and accordingly waveforms in nodes NA, NB, NC, ND and NE are also shown in an opposite phase, and an ODT control signal ODTLAT is outputted to turn off an on-die termination resistor. The ODT control signal ODTLAT is synchronized with a falling clock FCKDLL25.

According to the present invention as described above, during power-down mode, rising and falling clocks can be generated using an internal clock in synchronization with an external clock, and an ODT control signal can be generated in synchronization with the clocks. Accordingly, even in power-down mode, the time for generating an ODT control signal can be controlled as effectively and accurately as in normal mode.

Those skilled in the art will appreciate that the specific embodiments disclosed in the foregoing description may be readily utilized as a basis for modifying or designing other embodiments for carrying out the same purposes of the present invention. Those skilled in the art will also appreciate that such equivalent embodiments do not deunit from the spirit and scope of the invention as set forth in the appended claims.

What is claimed is:

1. An ODT control circuit, comprising:
a mode identification signal generation unit for logically combining an ODT enable signal and a clock enable signal and outputting a mode identification signal;
a clock control circuit which receives an internal clock signal and a DLL clock signal, and which selects either one of the internal clock signal or the DLL clock signal to output a plurality of delayed clock signals according to a power mode; and
an ODT control signal generation circuit which receives an ODT command, and which controls the ODT command with the internal clock signal and a plurality of the delayed clock signals to generate and output an ODT control signal,
wherein the clock control circuit includes:
a DLL clock enable signal generation unit which combines the ODT enable signal and the mode identification signal to output a DLL clock enable signal; and
an internal clock enable signal generation unit which combines the ODT enable signal and an inverted mode identification signal to generate an internal clock enable signal.

2. The ODT control circuit as set forth in claim 1, wherein the ODT control signal generation circuit includes:
an ODT buffer unit which receives an ODT command and buffers it to output an internal ODT command; and
an ODT control signal generation unit which controls the internal ODT command to generate an ODT control signal.

3. The ODT control circuit as set forth in claim 2, wherein the ODT control signal generation unit includes:
a latch unit which latches the internal ODT signal, and has a switch controlled by an internal clock signal and an output signal of the clock control circuit;
a reset unit which initializes the latch unit when an ODT enable signal becomes a low level; and
an ODT control signal output unit which combines an output signal of the latch unit to generate an ODT control signal.

4. The ODT control circuit as set forth in claim 3, wherein the latch unit includes:
a first latch unit having a first transmission gate which latches an output signal of the first inverter, and transmits a latch signal by a control of the internal clock signal;

a second latch unit having a second transmission gate which latches a signal transmitted by the first transmission gate, and transmits a latch signal by a control of a first output signal of the clock control circuit;

a third latch unit having a third transmission gate which latches a signal transmitted by the second transmission gate, and transmits a latch signal by a control of a second output signal of the clock control circuit;

a fourth latch unit having a fourth transmission gate which latches a signal transmitted by the third transmission gate, and transmits a latch signal by a control of a third output signal of the clock control circuit;

a fifth latch unit having a fifth transmission gate which latches a signal transmitted by the fourth transmission gate, and transmits a latch signal by a control of a fourth output signal of the clock control circuit; and a sixth latch unit which latches a signal transmitted to the fifth transmission gate.

5. The ODT control circuit as set forth in claim 4, wherein the ODT control signal output unit includes a NAND operation unit which inverts an output signal of the fifth latch unit to combine an output signal of the sixth latch unit.

6. The ODT control circuit as set forth in claim 1, wherein the mode identification signal generation unit outputs a normal mode signal when a clock enable signal is activated, and outputs a power-down mode signal when the clock enable signal is deactivated.

7. The ODT control circuit as set forth in claim 1, wherein the clock control circuit further includes:

a clock selection unit which selects either one of the DLL clock signal or the internal clock signal according to the clock enable signal; and a clock output unit which delays and outputs an output signal of the clock selection unit for a predetermined period of time.

8. The ODT control circuit as set forth in claim 7, wherein the DLL clock enable signal generation unit outputs a high level DLL clock enable signal during normal mode, and outputs a low level DLL clock enable signal during power-down mode.

9. The ODT control circuit as set forth in claim 7, wherein the DLL clock enable signal generation unit includes:

a NAND operation unit which combines the ODT enable signal and the mode identification signal to output a DLL clock enable bar signal; and an inverter which inverts an output of the NAND operation unit to output a DLL clock enable signal.

10. The ODT control circuit as set forth in claim 7, wherein the internal clock enable signal generation unit disables an internal clock enable signal during normal mode, and enables an internal clock enable signal during power-down mode.

11. The ODT control circuit as set forth in claim 7 wherein the clock selection unit includes:

a rising clock selection unit which selects and activates either one of a rising DLL clock signal among the DLL clocks or an internal clock signal; and a falling clock selection unit which selects and activates either one of a falling DLL clock signal among the DLL clocks or an internal clock bar signal.

12. The ODT control circuit as set forth in claim 11, wherein the rising clock selection unit includes:

a normal rising clock selection unit which activates a path of the rising DLL clock signal to output a rising DLL clock signal during normal mode; and a power-down rising clock selection unit which activates a path of the internal clock signal to output an internal clock signal during power-down mode.

13. The ODT control circuit as set forth in claim 11, wherein the falling clock selection unit includes:

a normal falling clock selection unit which activates a path of the falling DLL clock signal to output a falling DLL clock signal during normal mode; and a power-down falling clock selection unit which activates a path of the internal clock bar signal to output an internal clock bar signal during power-down mode.

14. The ODT control circuit as set forth in claim 7, wherein the clock output unit includes:

a rising clock output unit which outputs a rising clock signal among the output signals of the clock selection unit; and a falling clock output unit which outputs a falling clock signal among the output signals of the clock selection unit.

15. The ODT control circuit as set forth in claim 14, wherein the rising clock output unit includes a delay unit which delays and outputs the rising clock signal for a predetermined period of time.

16. The ODT control circuit as set forth in claim 15, wherein the delay unit includes a plurality of delay circuits having a different delay amount.

17. The ODT control circuit as set forth in claim 14, wherein the falling clock output unit includes a delay unit which delays and outputs the falling clock signal for a predetermined period of time.

18. The ODT control circuit as set forth in claim 17, wherein the delay unit includes a plurality of delay circuits having a different delay amount.

\* \* \* \* \*